US007035435B2

(12) United States Patent
Li et al.

(10) Patent No.: US 7,035,435 B2
(45) Date of Patent: Apr. 25, 2006

(54) SCALABLE VIDEO SUMMARIZATION AND NAVIGATION SYSTEM AND METHOD

(75) Inventors: Ying Li, Los Angeles, CA (US); Tong Zhang, Mountain View, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 10/140,511

(22) Filed: May 7, 2002

(65) Prior Publication Data

US 2003/0210886 A1 Nov. 13, 2003

(51) Int. Cl.
*G06K 1/00* (2006.01)
(52) U.S. Cl. .................. 382/107; 382/173; 348/700; 707/104.1
(58) Field of Classification Search ............. 382/107, 382/168, 172, 173, 180, 226, 305, 306; 348/699, 348/700, 701, 714, 715, 716, 717; 707/100, 707/104.1
See application file for complete search history.

(56) References Cited

U.S. PATENT DOCUMENTS

| | | | | |
|---|---|---|---|---|
| 5,635,982 | A | 6/1997 | Zhang et al. ............... 348/231 |
| 5,708,767 | A | 1/1998 | Yeo et al. ................... 395/140 |
| 5,933,549 | A | 8/1999 | Ide et al. .................... 382/309 |
| 5,995,095 | A | 11/1999 | Ratakonda .................. 345/328 |
| 6,252,975 | B1 | 6/2001 | Bozdagi et al. ............. 382/107 |
| 6,320,669 | B1 | 11/2001 | Wess et al. ................. 358/1.12 |
| 6,340,971 | B1 | 1/2002 | Janse et al. .................. 345/327 |
| 6,342,904 | B1 | 1/2002 | Vasudevan et al. ......... 345/723 |
| 6,535,639 | B1* | 3/2003 | Uchihachi et al. .......... 382/225 |
| 6,549,643 | B1* | 4/2003 | Toklu et al. ................. 382/107 |
| 6,738,100 | B1* | 5/2004 | Hampapur et al. ......... 348/702 |
| 2004/0125877 | A1* | 7/2004 | Chang et al. ........... 375/240.28 |
| 2004/0170321 | A1* | 9/2004 | Gong et al. ................. 382/173 |

FOREIGN PATENT DOCUMENTS

EP 1045316 A2 10/2000

OTHER PUBLICATIONS

Uchihashi et al., "Summarizing Video Using a Shot Importance Measure and a Frame-Packing Algorithm," *Proc. IEEE Int. Conf. on Acoustics, Speech, and Signal Processing*, Mar. 1999, pp. 3041-3044.*

Masumitsu et al., "Video Summarization Using Reinforcement Learning in Eigenspace," *Proc. IEEE Int. Conf. on Image Processing*, vol. II, Sep. 2000, pp. 267-270.*

Pfeiffer, S., et al., "Abstracting Digital Movies Automatically," *Journal of Communication and image Representation*, vol. 7, No. 4, Dec. 1996, pp. 345-353.

(Continued)

*Primary Examiner*—Andrew W. Johns

(57) ABSTRACT

A method and system for automatically summarizing a video document. The video document is decomposed into scenes, shots and frames, and an importance value is assigned to each scene, shot and frame. Keyframes are allocated among the shots based on the importance value of each shot. The allocated number of keyframes are then selected from each shot. The number of keyframes may be altered for greater or lesser detail in response to user input.

31 Claims, 14 Drawing Sheets

OTHER PUBLICATIONS

Zhang, T., "Using Backround Audio Change Detection for Segmenting Video," PDNO 10018002-1.

Girgensohn, A., et al., "Time-Constrained Keyframe Selection Technique," IEEE, 1999, pp. 756-761.

Kim, J., "Efficient Camera Motion Characterization for MPEG Video Indexing," IEEE, 2000, pp. 1171-1174.

Wang, H., "A Highly Efficient System for Automatic Face Region Detection in MPEG Video," *IEEE Transactions on Circuits and System for Video Technology*, vol. 7, No. 4, Aug. 1997, pp. 615-628.

Corridoni J M et al: Structured representation and automatic indexing of movie information content *Pattern Recognition*, Pergamon Press Inc. Elmsford, NY, US vol. 31, No. 12, Dec. 1, 1998, pp. 2027-2045, XP004139537.

Yueting Zhuang et al: "Adaptive key frame extraction using unsupervised clustering" *Image Processing, 1998 ICIP 98, Proceedings 1998 International Conference on*, Chicago, IL Oct. 4-7, 1998, Los Alamitos, CA USA, IEEE, Comput. Soc, US, pp. 866-870, XP010308833.

Dufaux F: "Key frame selection to represent a video" *IEEE Int Conf Image Process: IEEE International conference on Image Processing (ICIP 2000)* vol. 2, Sep. 10, 2000, pp. 275, 278, XP010529977.

Lagendijk R L et al: "visual search in SMASH system" *Proceedings of the International Conference on Image Processing (ICIP)* Lausanne, Sep. 16-19, 1996, New York, IEEE, US vol.1, pp. 671-674, XP010202483.

* cited by examiner

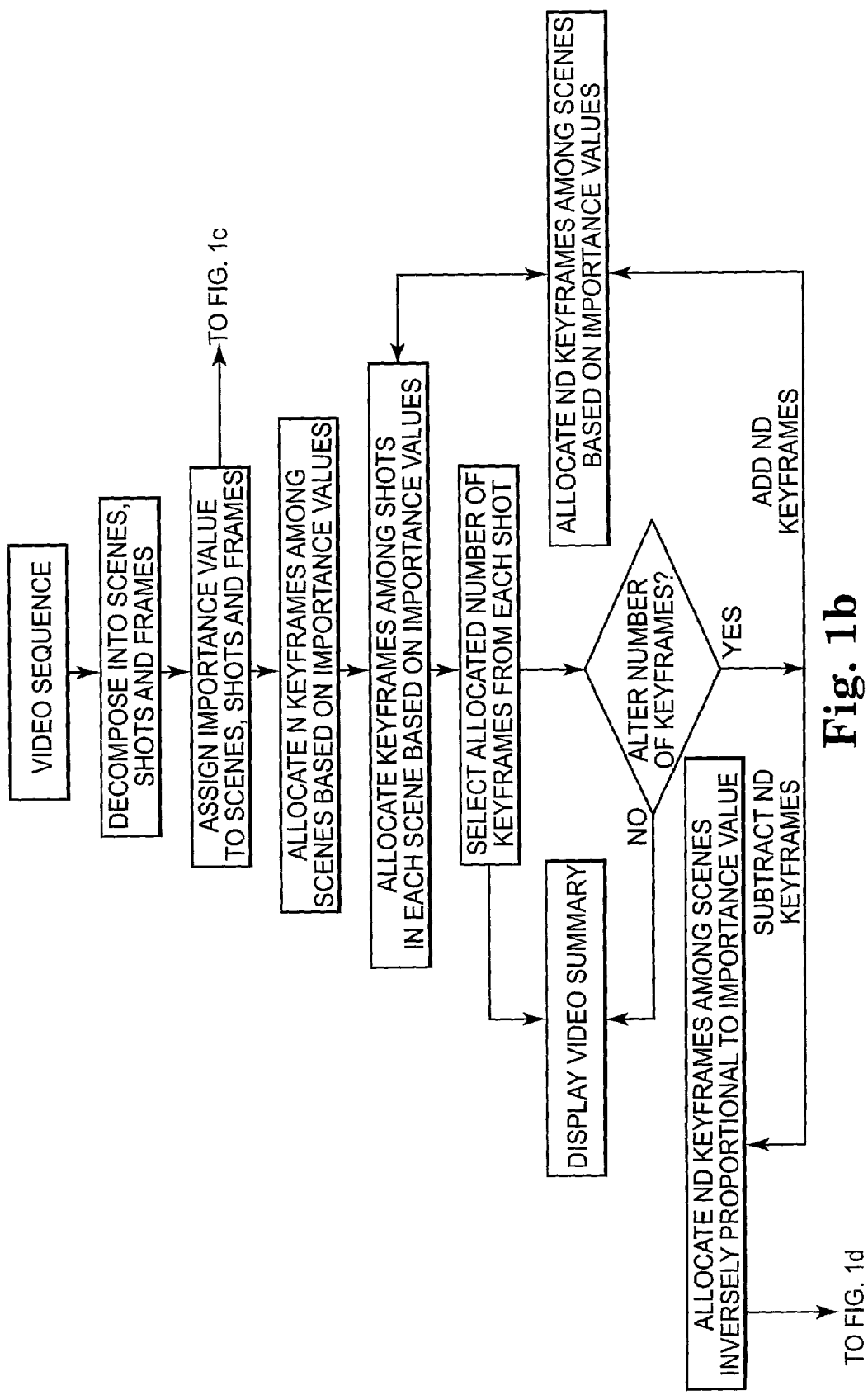

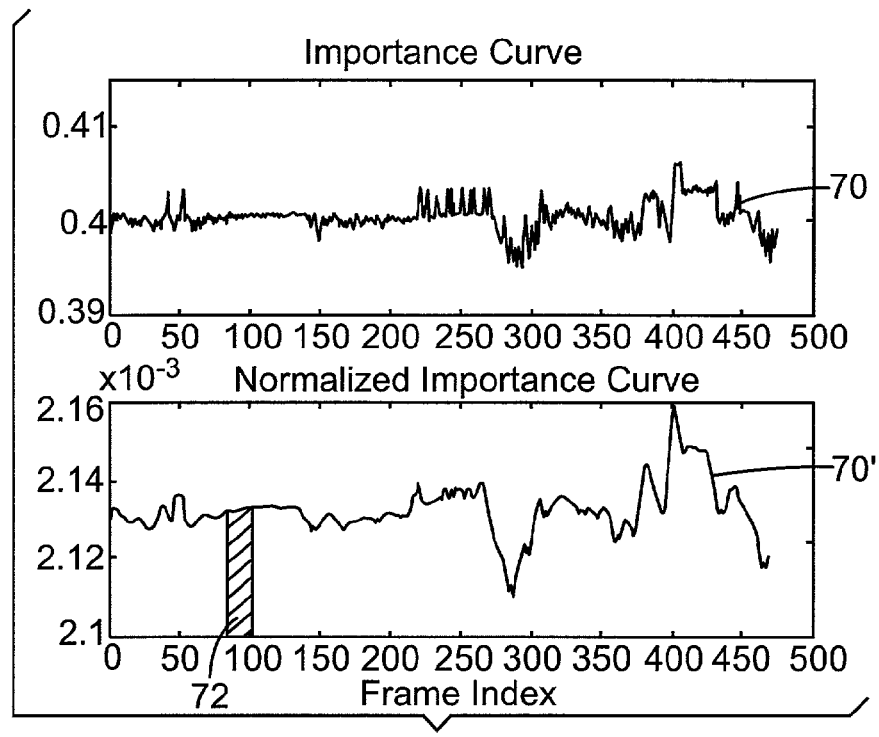
Fig. 12
 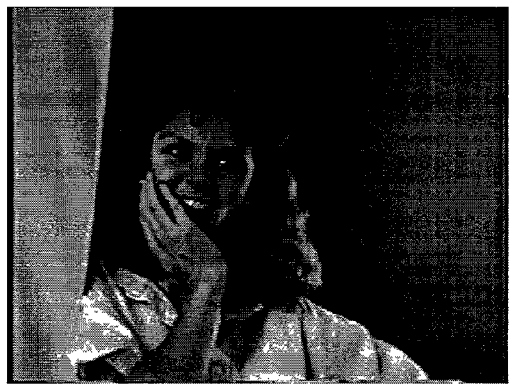
Fig. 13a         Fig. 13b

SCALABLE VIDEO SUMMARIZATION AND NAVIGATION SYSTEM AND METHOD

THE FIELD OF THE INVENTION

The present invention generally relates to summarizing and browsing of video material, and more particularly to automating and customizing the summarizing and browsing process.

BACKGROUND OF THE INVENTION

Digital video is a rapidly growing element of the computer and telecommunication industries. Many companies, universities and even families already have large repositories of videos both in analog and digital formats. Examples include video used in broadcast news, training and education videos, security monitoring videos, and home videos. The fast evolution of digital video is changing the way many people capture and interact with multimedia, and in the process, it has brought about many new needs and applications.

Consequently, research and development of new technologies that lower the costs of video archiving, cataloging and indexing, as well as improve the efficiency, usability and accessibility of stored videos are greatly needed. One important topic is how to enable a user to quickly browse a large collection of video data, and how to achieve efficient access and representation of the video content while enabling quick browsing of the video data. To address these issues, video abstraction techniques have emerged and have been attracting more research interest in recent years.

Video abstraction, as the name implies, is a short summary of the content of a longer video document which provides users concise information about the content of the video document, while the essential message of the original is well preserved. Theoretically, a video abstract can be generated manually or automatically. However, due to the huge volumes of video data already in existence and the ever increasing amount of new video data being created, it is increasingly difficult to generate video abstracts manually. Thus, it is becoming more and more important to develop fully automated video analysis and processing tools so as to reduce the human involvement in the video abstraction process.

There are two fundamentally different kinds of video abstracts: still-image abstracts and moving-image abstracts. The still-image abstract, also called a video summary, is a small collection of salient images (known as keyframes) extracted or generated from the underlying video source. The moving-image abstract, also called video skimming, consists of a collection of image sequences, as well as the corresponding audio abstract extracted from the original sequence and is thus itself a video clip but of considerably shorter length. Generally, a video summary can be built much faster than the skimming, since only visual information will be utilized and no handling of audio or textual information is necessary. Consequently, a video summary can be displayed more easily since there are no timing or synchronization issues. Furthermore, the temporal order of all extracted representative frames can be displayed in a spatial order so that the users are able to grasp the video content more quickly. Finally, when needed, all extracted still images in a video summary may be printed out very easily.

As a general approach to video summarization, the entire video sequence is often first segmented into a series of shots; then one or more keyframes are extracted from each shot by either uniform sampling or adaptive schemes that depend on the underlying video content complexity based on a variety of features, including color and motion. A typical output of these systems is a static storyboard with all extracted keyframes displayed in their temporal order. There are two major drawbacks in these approaches. First, while these efforts attempt to reduce the amount of data, they often only present the video content "as is" rather than summarizing it. Since different shots may be of different importance to users, it is preferably to assign more keyframes to important shots than to the less important ones. Second, a static storyboard cannot provide users the ability to obtain a scalable video summary, which is a useful feature in a practical summarization system. For example, sometimes the user may want to take a detailed look at certain scenes or shots which requires more keyframes, and sometimes the user may only need a very coarse summarization which requires fewer keyframes.

What is needed is a system and method to automatically and intelligently generate a scalable video summary of a video document that offers users the flexibility to summarize and navigate the video content to their own desired level of detail.

SUMMARY OF THE INVENTION

The invention described herein provides a system and method for automatically summarizing a video document. The video document is decomposed into scenes, shots and frames, and an importance value is assigned to each scene, shot and frame. A number of keyframes are allocated among the shots based on the importance value of each shot. The allocated number of keyframes are then selected from each shot. The number of keyframes may be altered for greater or lesser detail in response to user input.

BRIEF DESCRIPTION OF THE DRAWINGS

FIG. 1b is a flowchart illustrating one process for creating a video summary according to the invention.

FIG. 12 shows importance curve for an example video shot.

FIGS. 13a and 13b illustrate keyframe selection with and without consideration of the frame edge-energy.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
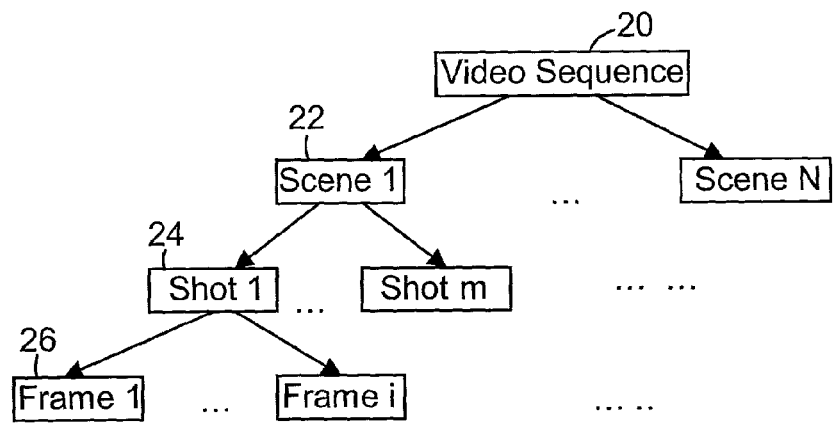
FIG. 1a is a schematic illustration of a hierarchical video structure.

According to the present invention, a video sequence 20 is first represented as a hierarchical tree based on the detected scene 22 and shot 24 structure as shown in FIG. 1a. As used herein, a shot 24 is defined as a video segment captured during a continuous shooting period and a scene 22 is composed of a set of semantically related shots 24. A shot 24 is composed of a series of individual frames 26. A variety of algorithms exist for shot and scene detection, any one of which may be suitable for use in decomposing a video sequence 20 into its scene 22, shot 24 and frame 26 structure. Depending upon the type of video sequence 20 being analyzed, one algorithm may be preferred over another. For example, an approach particularly suitable for use with home video is presented in U.S. patent application Ser. No. 10/020,255, filed Dec. 14, 2001 and commonly assigned herewith, and incorporated herein by reference.

Figure 1C:
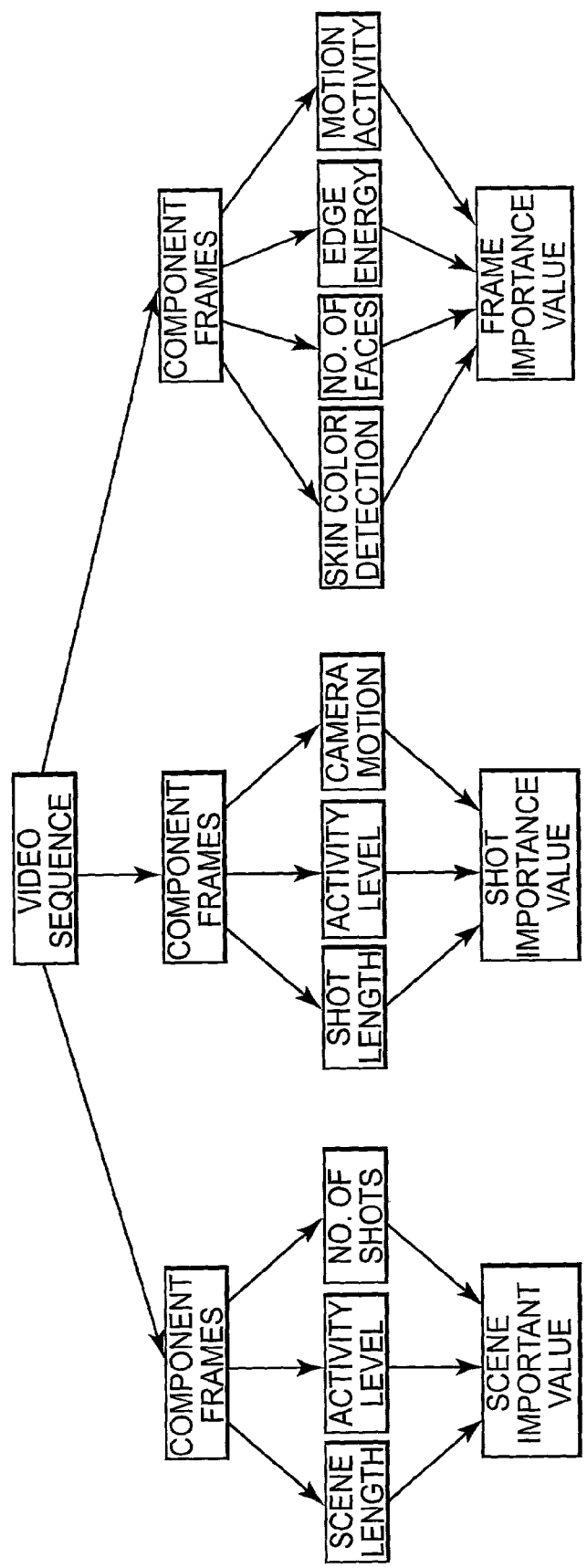
FIG. 1c is a flowchart illustrating one embodiment of the computation of importance values according to the invention.

One process for creating a video summary 80 according to the invention is illustrated in FIG. 1b. After decomposing the video sequence 20 into scenes 22, shots 24 and frames 26, each component scene 22, shot 24 and frame 26 is assigned an importance value based on measurements which are explained in greater detail below. One process for creating importance values according to the invention is illustrated in FIG. 1c. Next, given a desired number of keyframes N, keyframes are distributed among the underlying scenes 22 based on the importance value of the scenes 22, where the more important the scene 22, the more keyframes it is assigned. Then, within each scene 22, the assigned number of keyframes are further distributed among the scene's component shots 24, based on the importance value of the shots 24. Finally, the designated number of keyframes are selected from the underlying video frames 26 of each shot 24 according to the importance value of the frames 26. Using this process, a scalable video summarization 80 which assigns more keyframes to important scenes, shots and frames is achieved. Moreover, to meet the users' needs for flexible video content browsing, the specified number of keyframes may be allowed to grow and shrink as a user navigates the video content.

It becomes readily apparent that the performance of the invention described herein depends heavily on the definition and computation of the three categories of importance measurement with respect to the scenes 22, shots 24 and frames 26, respectively. The computation of the importance values is described in greater detail below.

Scene Importance Computation

Three factors are considered in determining the importance of a scene 22 according to one embodiment of the invention: 1) the scene length in terms of the number of frames in the scene; 2) the activity level of the scene; and 3) the number of component shots contained in the scene. The underlying rationale for the above considerations is that longer scenes, higher activity, and more shots are all indicative of an important scene. For example, if an interesting subject attracts the videographer's attention, more time will usually be spent capturing video than if the subject is uninteresting. Also, when the underlying video content of a scene 22 is highly dynamic (usually characterized by lots of camera motion, many object activities and a large number of contained shots), the scene 22 has complex contents, and thus deserves more keyframes.

Determination of scene length and the number of component shots 24 contained in a scene 22 is a straightforward process requiring little other than counting the number of frames 26 and shots 24 in a scene 22. Any suitable method of counting frames 26 and shots 24 may be employed to that end. The more difficult aspect is quantifying the activity level of a scene 22.

To quantify the activity level for a scene 22, the frame-to-frame color histogram difference for each consecutive frame pair within the scene is computed and their average is used as the scene's activity level indicator. Although the histogram difference is not a very accurate motion indicator, it is fast to compute and the results are sufficient for the scene level. More accurate, but also more time-consuming motion vector computation could also be used, as is described below with respect to computing the importance values of individual shots 24. Assuming the video sequence 20 being analyzed contains a total of SN scenes, and denoting scene i's importance by $IM_i$, the scene importance is computed as:

$$IM_i = \alpha 1 \times \frac{l_i}{\sum_{i=1}^{SN} l_i} + \beta 1 \times \frac{HD_i}{\sum_{i=1}^{SN} HD_i} + \gamma 1 \times \frac{SH_i}{\sum_{i=1}^{SN} SH_i}$$

where $\alpha 1$, $\beta 1$, and $\gamma 1$ are weighting coefficients that sum to 1, $l_i$ is scene i's length, $HD_i$ is its average histogram difference, and $SH_i$ is the number of its contained shots. If the total number of desired keyframes is N, then the number of keyframes $N_i$ assigned to scene i is $N_i = IM_i \times N$.

The values of $\alpha 1$, $\beta 1$, and $\gamma 1$ are empirically determined. According to one embodiment of the invention, the value of $\alpha 1$ may range from 0.10 to 0.20, the value of $\beta 1$ may range from 0.30 to 0.50, and the value of $\gamma 1$ may range from 0.40 to 0.60.

Shot Importance Computation

Three factors are considered in determining the importance of a shot 24 according to one embodiment of the invention: 1) the shot length in terms of the number of frames in the shot; 2) the activity level of the shot; and 3) the detected camera motion, where camera panning is primarily considered. The rationale for considering shot length and activity level is similar to that described above with respect to determining the importance of a scene 22. The reason for including camera motion detection is that shot content tends to be more complex when certain camera motion exists and thus the shot 24 deserves more keyframes.

As with determining the importance of a scene 22, shot length may be determined by counting the number of frames 26 in a shot 24 using any suitable counting method.

To compute the activity level of a shot 24, the amount of motion between every referenced frame pair within the shot is computed, and their average is used to indicate the activity level of the shot 24. Since many video sequences 20 (especially home videos) are digitized and compressed into H.26X or MPEG-X format, motion vector information may be directly obtained from the original bit stream which includes predictively coded frames 26. In particular, given a predictively coded frame, say, a P-frame, the magnitude of the motion vector mv for every macroblock is first computed, then the average magnitude of all motion vectors mv in the P-frame is used to indicate the activity level. If the video data does not include predictively coded frames 26, the video sequence 20 may either be translated to a format which does include predictively coded frames 26, or other methods known in the art may be used to determine and quantify motion vector mv information.

Figure 2:
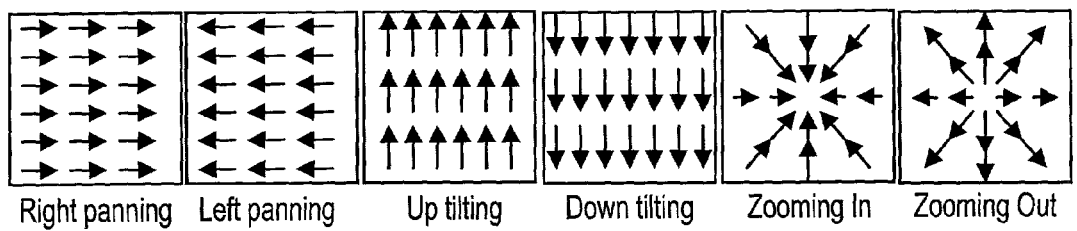
FIG. 2 illustrates the optical flow fields for camera panning, tilting and zooming.

Camera motion detection has been explored in the prior art, and most existing methods are based on analyzing the optical flow computed between consecutive images. Basically, all camera motion analysis work can be categorized into two classes: 1) algorithms that define an affine model for representing camera motion and estimate model parameters from the computed optical flow; and 2) algorithms that directly analyze the observed optical flow pattern without any motion models by using the angular distribution or the power of optical flow vectors. (See, for example, J. Kim, H. S. Chang, J. Kim and H. M. Kim, "Efficient camera motion characterization for MPEG video indexing", ICME2000, New York, 2000). Although either class of algorithms may be used, the first class of algorithms is sensitive to camera shaking and jerky motion, so for some applications, such as home video, the second class of algorithms are preferred. FIG. 2 shows the ideal optical flow patterns for three typical types of camera motion including camera panning, tilting and zooming.

Since estimation of the optical flow is usually based on gradient methods or block matching methods using raw video data, it can be very computationally expensive. According to one embodiment of the present invention, it is contemplated that ready-to-use motion vector mv information is embedded in the video data bit stream (as in MPEG-X or H.26X formats). This information may be used as an alternative to estimation of the optical flow to reduce the computational load. Camera motion may be detected by analyzing the layout pattern of the extracted motion vectors mv. As stated above with respect to determining the shot 24 activity level, if the video data does not include predictively coded frames 26 containing motion vector mv information, the video may either be translated to a format which does include predictively coded frames, or other methods known in the art may be used to determine and quantify motion vector information.

Figure 3:
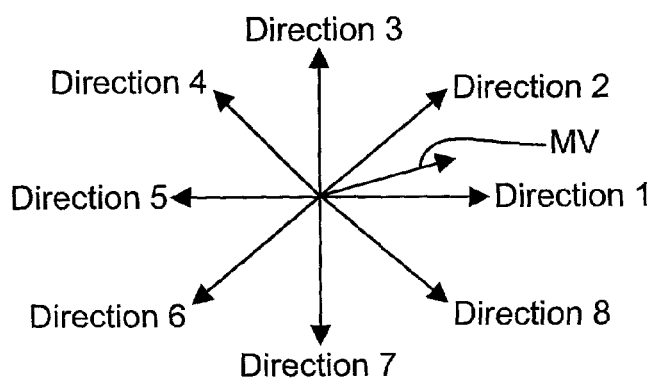
FIG. 3 illustrates the eight directions into which camera motion is quantized.

As shown in FIG. 3, camera motion is quantized into eight directions. Each direction includes the nearest sub-region along the counter-clockwise direction. For example, if the motion vector mv sits in the region of 0–45 degrees, it is indexed as direction 1. The discussion below focuses on the detection of camera panning, as this is the major camera motion observed in a home video. Ideally, during a camera panning, all motion vectors mv should unanimously point in direction 1 or 5, as shown in FIG. 3. However, due to camera shake, there will also be motion vectors sitting mv in the regions of directions 1 and 8, or directions 4 and 5.

Figure 4:
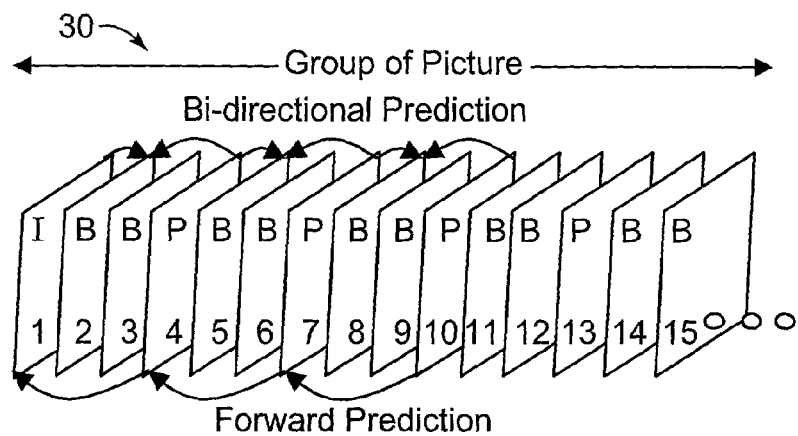
FIG. 4 illustrates an example of an MPEG Group of Picture structure.

In a typical MPEG video sequence, there are three frame types: I, P and B frames. All I-frames are intra-coded without motion estimation and compensation, while P-frames are predictively coded from either a previous I-frame or P-frame. Each macroblock within a P-frame could be intra-coded, forward-predicted or simply skipped. To further improve the compression ratio, a B-frame is defined which could be bi-directionally predictively coded from previous and future I- and P-frames. FIG. 4 shows a typical MPEG GOP (Group Of Picture) structure 30 which contains fifteen frames with a pattern of IBBPBBPBB . . . . Since a B-frame may contain both forward- and backward-predicted motion vectors mv which will likely confuse camera motion detection, all B-frames are discarded, and only P-frames are used. This is acceptable since with a typical 29.97 frame per second rate, there may be eight P-frames within a second, and a typical camera motion will usually last longer than one second.

Figure 5A:
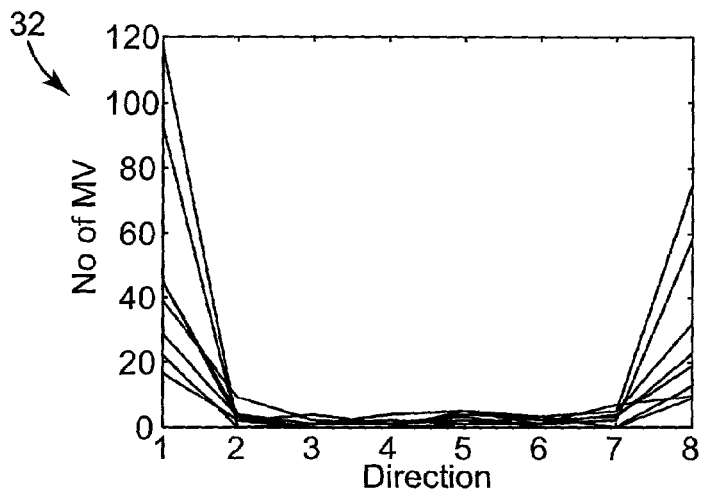
FIGS. 5a and 5b are examples of histograms showing camera right panning and zooming, respectively.
Figure 5B:
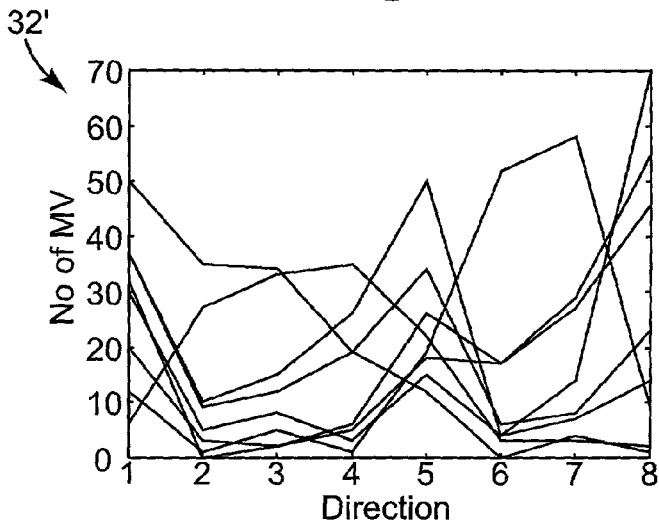

Three major steps are involved in the method described herein for detecting camera motion. In step 1, the motion vectors mv of each P-frame are categorized into the above described eight directions, and a direction histogram 32 is computed. If a frame 26 does belong to a camera motion sequence, say, a right camera panning, then it should have a majority number of motion vectors mv in directions 1 and 8, otherwise the motion vectors mv may be scattered without a major direction represented. Moreover, a continuous series of P-frames are required to present a similar motion pattern before declaring that a camera motion is detected. This is illustrated in FIGS. 5a and 5b. FIG. 5a shows a histogram 32 of 8 P-frames within a right panning sequence, and FIG. 5b shows a histogram 32' of 8 P-frames within a camera zooming sequence. It is very apparent that almost all P-frames in FIG. 5a present a similar pattern with the major direction pointing to right. In FIG. 5b, the motion vectors mv are almost equally distributed along each direction which characterizes a zooming sequence.

In step 2 of the method for detecting camera motion, the directional motion ratio r and the average magnitude of the directional motion vectors (AvgMag) of the P-frame are computed. In case of a right camera panning, r is the ratio of the amount of motion vectors mv along directions 1 and 8 over the total number of motion vectors mv contained in the frame 26. If r is larger than a certain threshold, say, 0.6, the frame 26 is indexed as a candidate. The value of r is selected empirically, and in one embodiment of the invention may have a value in the range of 0.5 to 0.7. AvgMag is simply the average of the magnitudes of all motion vectors mv in directions 1 and 8.

Figure 6A:
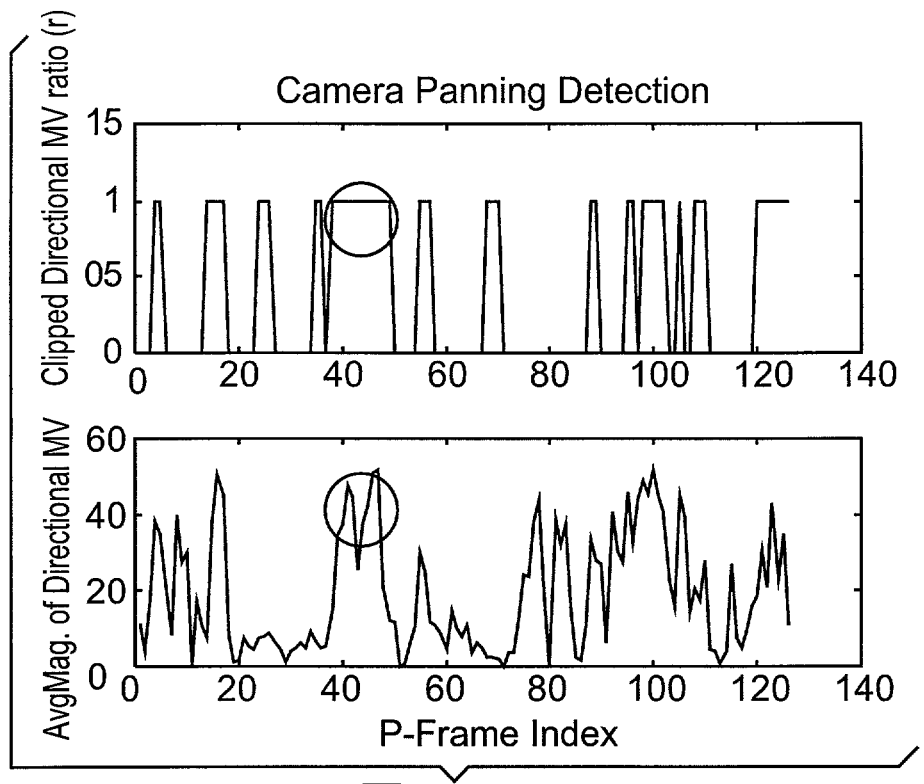
FIGS. 6a and 6b are graphs of the statistics r and AvgMag, showing a video shot containing a camera panning sequence and a shot without camera motion, respectively.
Figure 6B:
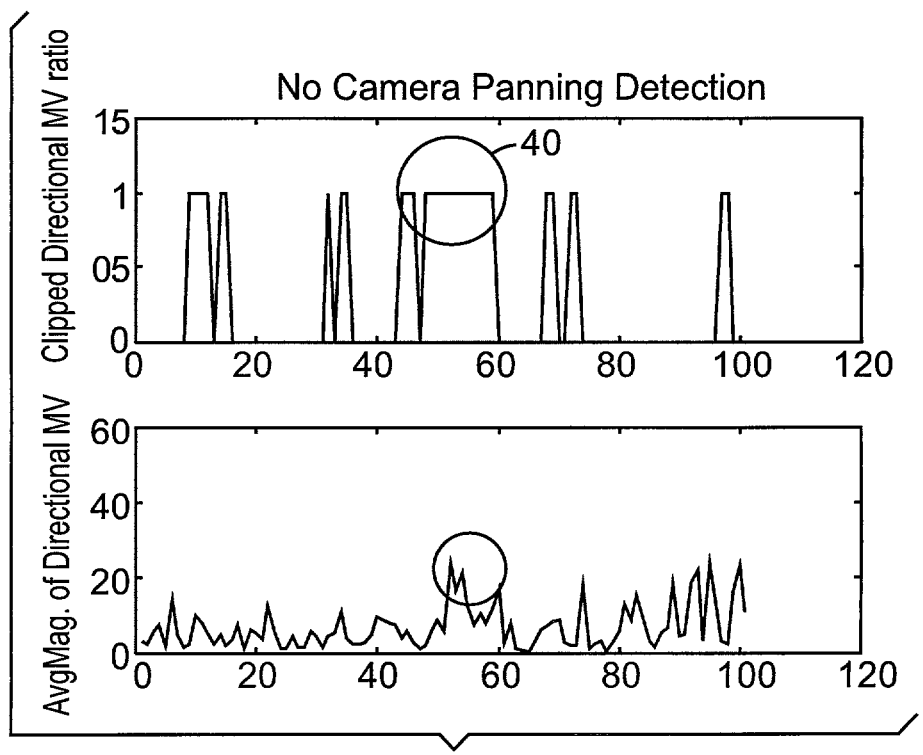

In step 3 of the method for detecting camera motion, the above calculations are repeated for every P-frame within a given shot. If a sequence 40 of candidates with sufficient length is observed and its average AvgMag is larger than a preset threshold, a camera panning sequence is declared to be detected; otherwise, no camera motion exists. FIGS. 6a and 6b each show graphs of the statistics r and AvgMag, where FIG. 6a is a shot containing a camera panning sequence and FIG. 6b is a shot without camera motion. By observing them carefully, one can see that only considering r without taking into account the AvgMag, may lead to incorrect detection of camera motion. For example, considering only r would likely lead to a wrong motion detection decision on the shot sequence of FIG. 6b since there is also a long candidate sequence caused by a minor shaky motion of the camera. Finally, if more accurate detection results are desired, the standard deviation of the directional motion vectors' magnitude StdMag may also be considered. For example, if there is a continuous camera panning sequence, the StdMag value should be quite small due to the motion consistency.

Now, assume there are a total of SH shots within scene i. Then shot i's importance $IMS_i$ could be computed as $$IMS_i = \alpha 2 \times \frac{ls_i}{\sum_{i=1}^{SH} ls_i} + \beta 2 \times \frac{Act_i}{\sum_{i=1}^{SH} Act_i} + \gamma 2 \times \frac{Cam_i}{\sum_{i=1}^{SH} Cam_i}$$

where $\alpha 2$, $\beta 2$, and $\gamma 2$ are weighting coefficients that sum to 1, $ls_i$ is shot i's length, $Act_i$ is its average motion vector magnitude, and $Cam_i$ is a binary camera motion detection result. Now, given scene i's assigned keyframes $N_i$, the number of keyframes $NS_i$ assigned to shot i is $NS_i = IMS_i \times N_i$. If $NS_i$ is less than 1, the value of $NS_i$ may be set to 1 if it is desired that at least one keyframe be extracted from each shot. Alternately, the value of $NS_i$ may be set to 0 if it is not preferred that at least one keyframe be extracted from each shot.

The values of $\alpha 2$, $\beta 2$, and $\gamma 2$ are empirically determined. According to one embodiment of the invention, the value of $\alpha 2$ may range from 0.3 to 0.5, the value of $\beta 2$ may range from 0.4 to 0.6, and the value of $\gamma 2$ may range from 0.0 to 0.2.

Frame Importance Computation

Four factors are considered in determining the importance of a frame 26 according to one embodiment of the invention: 1) the percentage of skin-colored pixels in the frame; 2) the number of detected human faces in the frame; 3) the distribution of the frame's edge energy; and 4) the amount of motion activity contained in the frame. The reason for including the first two factors is that, generally speaking, a frame 26 that contains a human face will be more informative than, for example, a landscape frame. In case a face is missed by the face detection algorithm, the skin-color detection could compensate for the missed face detection. The last two factors are used to make sure that the extracted keyframe is a well-focused clear image and not a blurry image, such as is caused by a fast camera motion, fast object movement or a bad camera focus. For example, the still image taken after a camera panning is preferred over the image taken during the panning which may be blurred or unstable. Thus, in the case of frame importance, frames 26 which contain less activity are preferred.

Figure 7A:
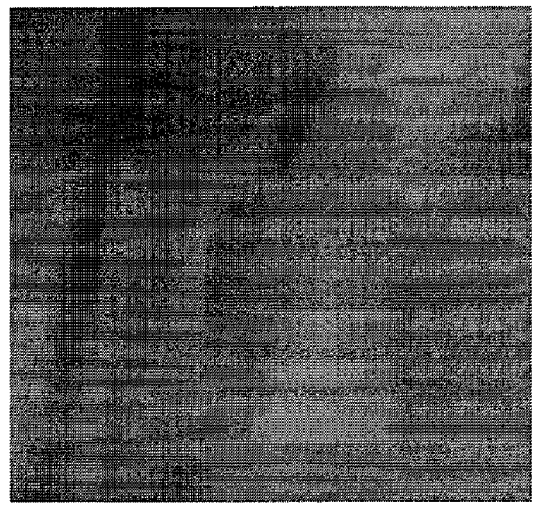
FIGS. 7a and 7b show the region occupied by skin colors in CbCr color space.
Figure 7B:
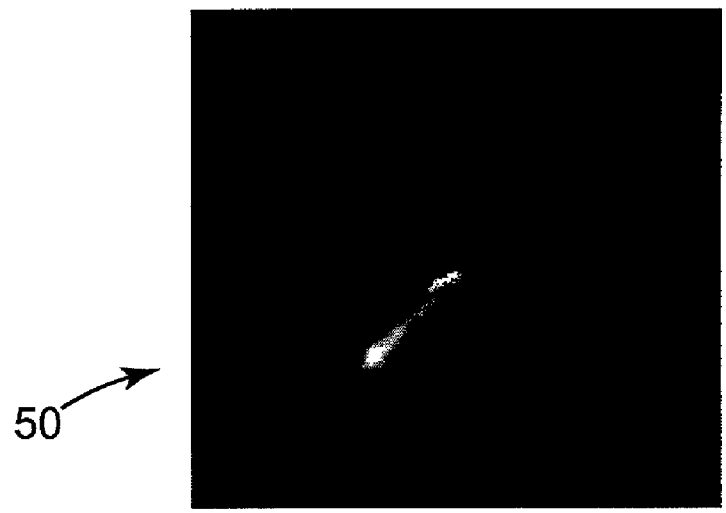

Skin-color detection has been explored extensively in both face detection and face recognition areas. Primarily two models have been evaluated and used. The YCbCr model is naturally related to MPEG and JPEG coding, and the HSV (Hue, Saturation, Value) model is mainly used in computer graphics. To approximate the skin color subspaces, skin-color patches have been used to define skin tone regions in both models. Also, since the intensity value Y is observed to have little influence on the distribution of skin color, some work has directly performed the skin color classification in the chrominance plane (CbCr) without taking Y into account. (See, for example, H. Wang and S.-F. Chang, "A highly efficient system for automatic face region detection in MPEG video", IEEE Transaction on Circuit System and Video Technology, vol. 7, no. 4, pp. 615–628, 1997). FIG. 7a shows the hues in CbCr color space, while FIG. 7b shows the corresponding region occupied by the skin color, which is obtained from data consisting of various still images that cover a large range of skin color appearance (different races, different lighting conditions, etc.). It can be seen that the skin color samples actually form a single and quite compact cluster in the CbCr color space. Derived from this observation, the following rule in terms of RGB is used to classify a color as skin-color:

If (Y>=32) and (G<0.8*R) and (B<G) and (B>0.7*G), then it is a skin-color.

Figure 8A:
FIG. 8 shows an example where skin color detection recognizes one face while another face is neglected.
Figure 8B:

The reason to include the Y criterion is to exclude regions that are too dark. FIG. 8a (showing a video frame 26) and FIG. 8b (a skin color reduction of the video frame in FIG. 8a) show an example where skin color detection allows the man's face to be well recognized, while the woman's face in the back is neglected since it is in shadow.

Figure 9A:
FIGS. 9a and 9b show an example where face recognition algorithms fail to detect a face in one frame, and while detecting a face in another frame.
Figure 9B:
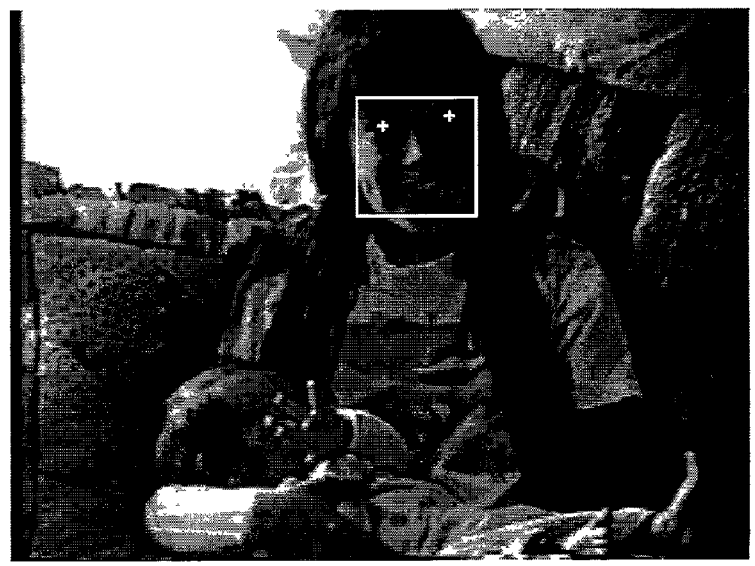

Face detection and recognition algorithms are known in the art. Any suitable algorithm may be used in the implementation of the invention described herein. Consideration may be given to the sensitivity of an algorithm and the computational load required by a particular algorithm. FIGS. 9a and 9b show instances where a face is not detected (FIG. 9a) and where a face is detected (FIG. 9b).

Figure 10D:
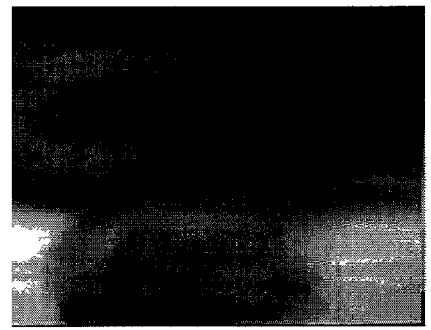
FIGS. 10a–10d show examples of applying a vertical edge operator to select a well focused keyframe.
Figure 10C:
Figure 10B:
Figure 10A:

Due to the casual photography nature of most home video, one can easily find many blurry and badly-focused video frames 26. Generally speaking, preferred keyframes will be well-focused clear images with distinct edges. This preference is applied to help identify appropriate keyframe candidates. Specifically, for a given frame, an edge operator is used to find all the edges of the frame. Then, the standard deviation of edge energy is computed. If the standard deviation of edge energy is larger than a preset value, the frame is declared to be well focused and is qualified to be a keyframe; otherwise, the frame is discarded as a keyframe candidate. FIGS. 10a through 10d show examples of applying a vertical edge operator on two images where one is blurry (FIG. 10a) and the other one clear (FIG. 10c). It can easily be seen that the clear image of FIG. 10c has very distinct edges (FIG. 10d), while the blurry image of FIG. 10a has edges which are barely discernable, if at all (FIG. 10b).

Figure 11:
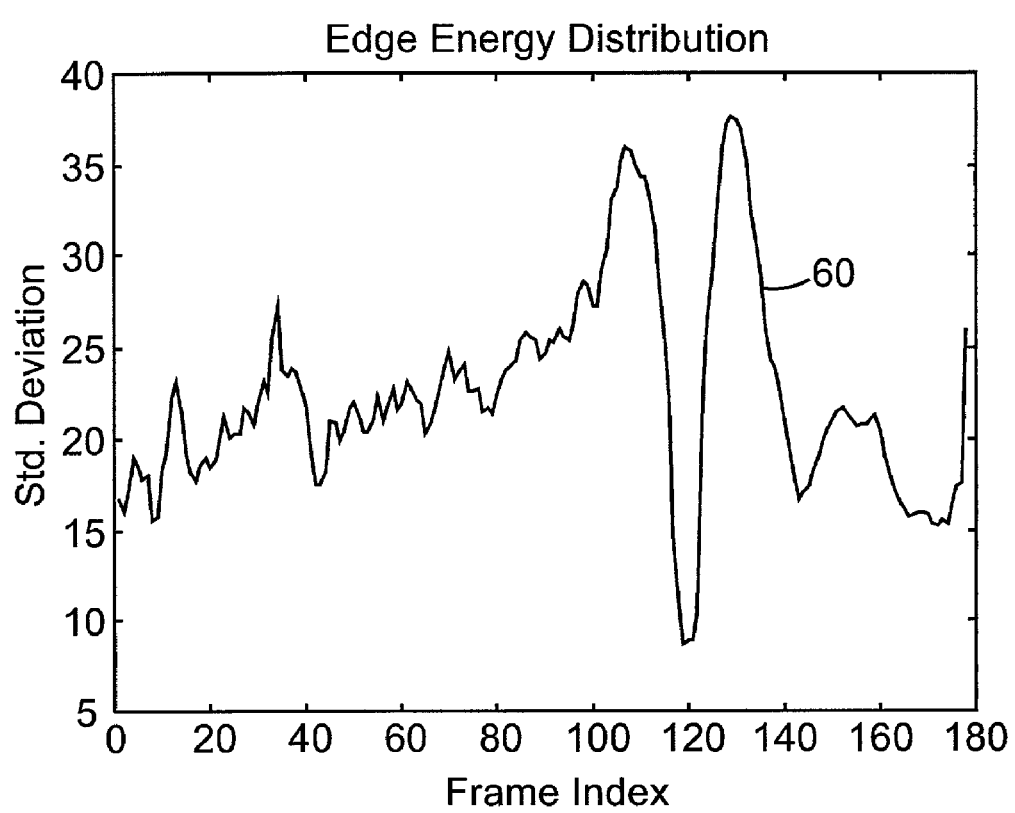
FIG. 11 is a graph of the computed standard deviation of edge energies for an example video shot.

Edges may be detected in several suitable manners. One suitable manner to detect the edge is the use of a "Prewitt" edge operator, where the following two gradients are used:

$$G_R = \frac{1}{3}\begin{bmatrix} 1 & 0 & -1 \\ 1 & 0 & -1 \\ 1 & 0 & -1 \end{bmatrix} \text{ and } G_c = \frac{1}{3}\begin{bmatrix} -1 & -1 & -1 \\ 0 & 0 & 0 \\ 1 & 1 & 1 \end{bmatrix}$$

where $G_R$ and $G_C$ are the row and column gradients, respectively. FIG. 11 shows the computed standard deviations 60 of the edge energies for all frames 26 within one particular shot 24. As can be seen, most of the frames 26 in the shot 24 have small values except a couple of frames 26 with larger numbers. As a matter of fact, this shot 24 contains many blurry portions and only a few well-focused frames 26.

Keyframe Selection

Assume there are a total of F frames within shot i. Then frame i's importance $IMF_i$ could be computed as $$IMF_i = \alpha 3 \times \frac{PS_i}{\sum_{i=1}^{F} PS_i} + \beta 3 \times \frac{NF_i}{\sum_{i=1}^{F} NF_i} + r3 \times \frac{EStd_i}{\sum_{i=1}^{F} EStd_i} + \delta \times \left(1 - \frac{FAct_i}{\sum_{i=1}^{F} FAct_i}\right)$$

where $\alpha 3$, $\beta 3$, $\gamma 3$, and $\delta$ are weighting coefficients that sum to 1, $PS_i$ is the percentage of skin-colored pixels, $NF_i$ is the number of detected faces, $EStd_i$ is the standard deviation of computed edge energy, and $FAct_i$ is the contained motion activity in frame i. It should be noted that since the face and edge detections are both very time-consuming, it is unnecessary to repeat them for every single frame. Instead, a small set of neighboring frames can usually share the same face and edge detection result due to continuity of the video content.

The values of $\alpha 3$, $\beta 3$, $\gamma 3$ and $\delta$ are empirically determined. According to one embodiment of the invention, the value of $\alpha 3$ may range from 0.1 to 0.3, the value of $\beta 3$ may range from 0.1 to 0.3, the value of $\gamma 3$ may range from 0.1 to 0.3, and the value of $\delta$ may range from 0.3 to 0.5.

After frame importance has been determined, the number of keyframes $NS_i$ assigned to each shot must be selected from all F frames in the shot. If all F frames are sorted in the descending order based on their importance values, theoretically the top $NS_i$ frames should be chosen as the keyframes since those frames are the most important ones. However, if one frame has a large importance value, many of its neighboring frames will also have large importance values due to the visual and motion continuities of the video content. Thus, all or many of the allocated keyframes may be taken from the same temporal region of the shot, and may not provide a good representation of the video content.

To provide a better representation of the video content of a shot, either time-constrained keyframe selection or importance adapted keyframe selection may be used. In time-constrained keyframe selection, two additional rules are enforced. First, keyframes should be visually different from each other. Specifically, the newly extracted keyframe should be visually different from all pre-extracted keyframes. Color histogram comparisons are one method which may be used for this purpose. Second, keyframes should be temporally separated from each other. Specifically, all extracted keyframes should be distributed as uniformly as possible among the shot so as to cover the entire video content. A set of well-spread keyframes will usually represent the underlying video content better than a set of temporally clustered keyframes.

In importance-adapted keyframe selection, keyframes are selected by adapting to the underlying importance curve. In particular, the importance values of all frames within the shot are first normalized to form a curve with the underlying area equals to one. FIG. 12 shows the importance curve 70 of one particular shot where the lower (normalized) curve 70' is obtained from the upper raw curve by using a 3×1 mean filter. Next, the entire temporal axis of the shot is partitioned into $NS_i$ segments 72 (only one segment 72 is shown in the figure) in a way such that the sum of the importance values inside each segment 72 (i.e. the area under the curve) equals $1/NS_i$. The frame 26 having the highest importance within each segment 72 is then chosen as the representative frame 26. To ensure that all extracted keyframes are well spread out in the timeline, a time restriction rule like that used in time-constrained keyframe selection may be used.

Based on experimental results, time-constrained keyframe selection generates slightly better results than importance-adapted keyframe selection, yet at the cost of lower speed due to the color histogram computation and comparison. Finally, in time-constrained keyframe selection, the number of extracted keyframes may be less than $NS_i$ if the underlying shot has a flat content.

Experimental results verify the effectiveness of the factors used to determine a frame's importance. FIGS. 9a and 9b show two frames where FIG. 9b is the keyframe extracted after including face detection and FIG. 9a is the original candidate. The image of FIG. 9b is clearly the better choice, as it allows easier identification of the person in the image. FIGS. 13a and 13b show another two frames where the initially selected keyframe shown in FIG. 13a is replaced by the frame shown in FIG. 13b when the edge-energy restriction factor is enforced. The image of FIG. 13b is more clearly focused and visually more pleasant than the fuzzy image of FIG. 13a.

After generating the initial keyframe set N, as described above, a new keyframe set N' may be constructed based on the shot-and-scene structure. A new keyframe set N' may be desired if the user wants either more keyframes and greater detail (N'>N) or fewer keyframes and less detail (N'<N) in the video summary.

When more keyframes are needed, the additional number of keyframes must be extracted from the underlying video content. Given ND (ND=N'−N) more keyframes that we need to extract, the extra keyframes are assigned to all underlying scenes 22 and shots 24 based on their respective importance values, in a manner like that described above when generating the initial keyframe set N. The basic assignment rule is that more important scenes 22 and shots 24 get more keyframes. A keyframe extraction process similar to that described above may be applied after each shot 24 gets the new designated number of keyframes.

Figure 1D:
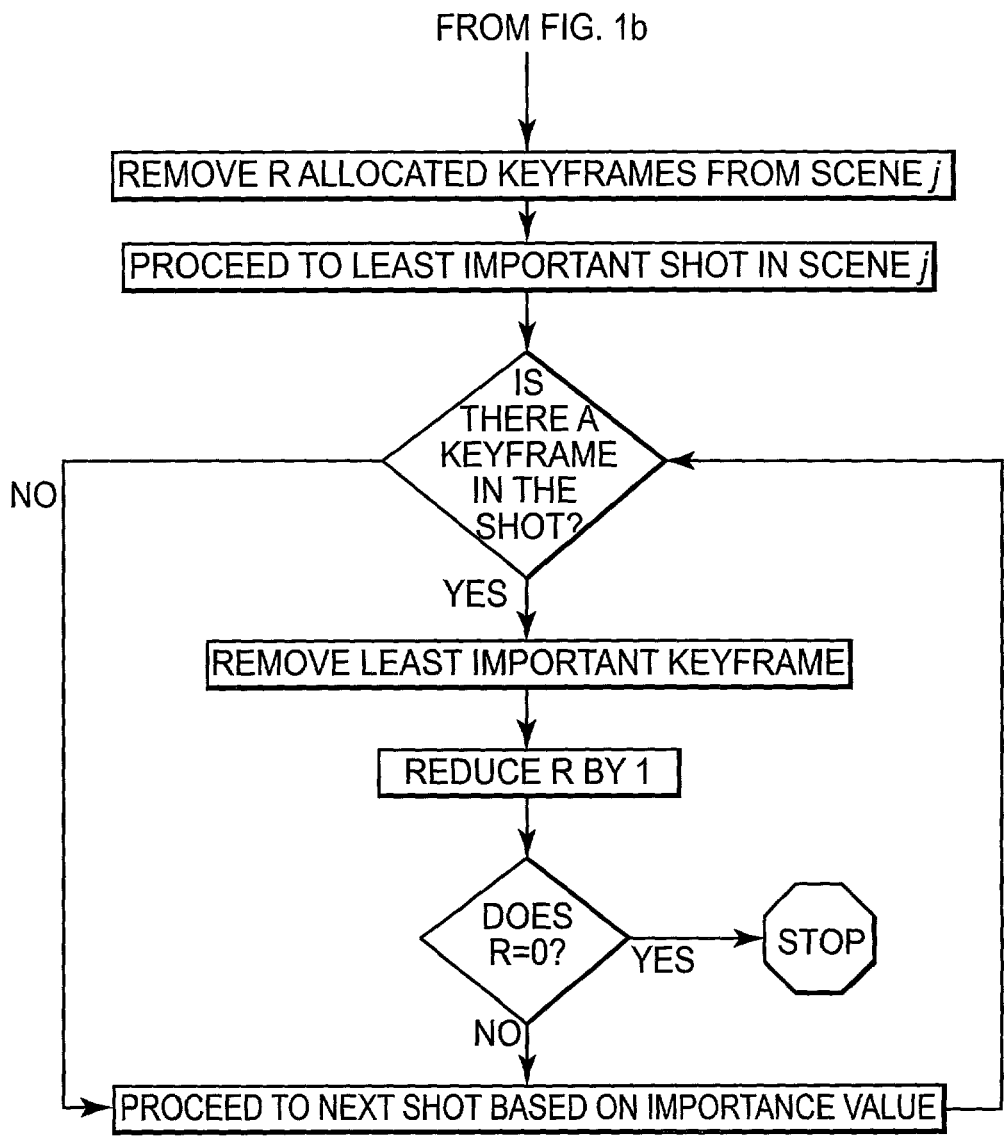
FIG. 1d is a flowchart illustrating one embodiment of the removal of keyframes according to the invention.

When fewer keyframes are needed, the excess keyframes are removed from the initial keyframe set N. As illustrated in FIG. 1d, given ND (ND=N−N') keyframes that must be removed from the original set N, the ND keyframes are distributed among the underlying scenes 22, where the number of keyframes to be removed from a scene 22 is inversely proportional to the scene 22 importance. Assuming R frames need to be removed from scene j's keyframe set, the procedure is as follows: Starting from the least important shot 24 within the scene 22, check each shot 24. If it contains more than one keyframe, remove the least important keyframe, and decrease R by 1. If R equals 0, stop; otherwise, continue with the next shot 24. If the last shot 24 is reached, start over again with the least important shot 24. In case there is only one keyframe left for every shot 24, and R is still greater than 0, then, starting from the least important shot 24, remove its last keyframe.

Thus, a scalable video summary 80 based on user's preference may be achieved. Moreover, a real-time video summarization may be achieved if the initial keyframe set N is generated offline. The value of a scaleable video summary can be seen in the example where a user wants to navigate along the hierarchical (scene-shot-frame) video tree. For instance, if the user wants a detailed summary of certain scenes 22 or shots 24 while only wanting a brief review of others, the invention as described herein can easily achieve this by using a predefined but tunable scale factor. Specifically, based on the initial keyframe assignment quota, the scale factor may be used to calculate the currently desired number of keyframes for the desired shot, scene, or even the whole sequence. Then the keyframes will be extracted or removed using the scheme discussed above. If the user is unhappy with the default navigation scale, he can easily tune it to his own satisfaction.

The video summarization and navigation system described herein may be implemented on a variety of platforms, such as a home computer 100, so long as the chosen platform possesses a processor 102 with sufficient computing power, a data storage system 104 for storing the video summary, and an interface 106 for allowing the user to alter the level of detail of the video summary 80. The data storage system 104 may be a hard disk drive or other persistent storage device, or the random access memory of the chosen platform. The video summary 80 may be displayed on a display device 108, for example, on a video monitor, or on a hard copy generated by a printer.

Experimental Results

Figure 14A:
FIGS. 14a and 14b show an example of the scalable video summary described herein.
Figure 14B:
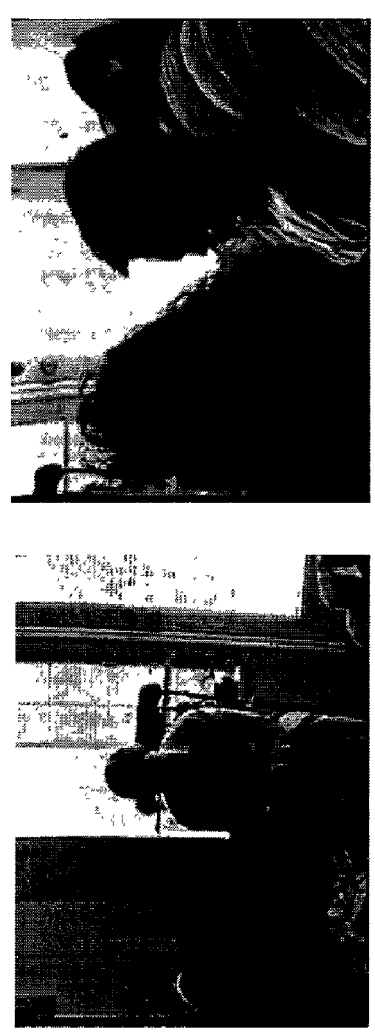
Figure 15:
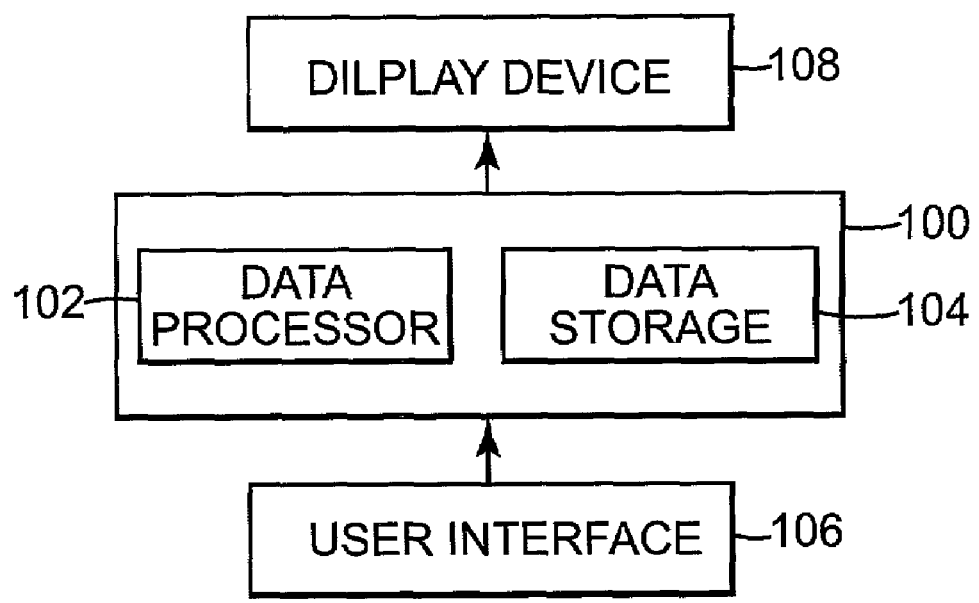
FIG. 15 is a schematic representation of a computer system usable to create a video summary according to the invention.

FIGS. 14a and 14b show an example of the scalable video summary 80 described herein, where FIG. 14a shows three initially generated keyframes for a particular shot, and FIG. 14b shows two more extracted keyframes when the user requires a more detailed look at the underlying content. This shot actually contains a long sequence of camera panning to introduce all present guests, and it can be seen that the two additional keyframes give the user a better understanding of the shot.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the computer and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for automatically summarizing a video document comprising the steps of:
    decomposing the video document into scenes, shots and frames;
    assigning an importance value to each scene, shot and frame;
    allocating a number of keyframes among the shots based on the importance value of each shot;
    selecting the allocated number of keyframes from each shot; and
    altering the number of keyframes in response to user input.

2. The method of claim 1, wherein the number of keyframes allocated among the shots is a predetermined number of keyframes.

3. The method of claim 2, wherein altering the number of keyframes in response to user input includes the step of removing one or more keyframes from the predetermined number of selected keyframes.

4. The method of claim 3, wherein removing one or more keyframes from the predetermined number of selected keyframes includes the step of removing the least important keyframe in the least important shot.

5. The method of claim 2, wherein altering the number of keyframes in response to user input includes the step of adding one or more keyframes to the predetermined number of selected keyframes.

6. The method of claim 1, wherein assigning an importance value to each scene, shot and frame includes the steps of defining a scene importance algorithm, a shot importance algorithm and a frame importance algorithm and computing the importance value of the scenes, shots and frames, respectively, with the algorithms.

7. The method of claim 6, wherein computing a scene importance value includes the steps of measuring a length of the scene, quantifying the activity level of the scene, and counting the number of shots in the scene.

8. The method of claim 6, wherein computing a scene importance value includes the step of measuring a length of the scene.

9. The method of claim 8, wherein measuring a length of the scene includes the step of counting the number of frames in the scene.

10. The method of claim 6, wherein computing a scene importance value includes the step of quantifying the activity level of the scene.

11. The method of claim 10, wherein quantifying the activity level of the scene includes the steps of computing a color histogram difference for each consecutive frame pair within the scene and using their average to indicate the scene activity level.

12. The method of claim 6, wherein computing a scene importance value includes the step of counting the number of shots in the scene.

13. The method of claim 6, wherein computing a shot importance value includes the steps of measuring a length of the shot, quantifying the activity level within the shot, and quantifying camera motion within the shot.

14. The method of claim 6, wherein computing a shot importance value includes the step of measuring a length of the shot.

15. The method of claim 14, wherein measuring a length of the shot includes the step of counting the number of frames in the shot.

16. The method of claim 6, wherein computing a shot importance value includes the step of quantifying the activity level within the shot.

17. The method of claim 16, wherein quantifying the activity level within the shot includes the steps of computing the amount of motion between every referenced frame pair within the shot and using their average to indicate the shot activity level.

18. The method of claim 6, wherein computing a shot importance value includes the step of quantifying camera motion within the shot.

19. The method of claim 18, wherein quantifying camera motion within the shot includes the steps of categorizing the direction motion vectors of each frame into a discrete number of directions and computing a motion vector histogram, and computing a directional motion ratio and an average magnitude of the directional motion vectors.

20. The method of claim 6, wherein computing a frame importance value includes the steps of determining the percentage of skin-colored pixels in the frame, and counting the number of detected human faces in the frame.

21. The method of claim 20, wherein computing a frame importance value further includes the step of calculating the edge energy distribution of the frame.

22. The method of claim 20, wherein computing a frame importance value further includes the step of quantifying the amount of motion activity contained in the frame.

23. The method of claim 1, wherein selecting the allocated number of keyframes from each shot includes the step of selecting the keyframes with the highest importance value.

24. The method of claim 1, wherein selecting the allocated number of keyframes from each shot comprises selecting the keyframes using time-constrained keyframe selection.

25. The method of claim 1, wherein selecting the allocated number of keyframes from each shot comprises selecting the keyframes using importance-adapted keyframe selection.

26. The method of claim 1, wherein allocating a number of keyframes among the shots includes the steps of assigning the keyframes among the scenes based on the importance value of the scenes, and within each scene, distributing the assigned keyframes to the component shots of each scene.

27. The method of claim 1, further comprising the step of displaying the selected keyframes on a display device.

28. A computer readable medium containing instructions for controlling a computer system to perform a method for summarizing a video document comprising the steps of:
   decomposing the video document into scenes, shots and frames;
   assigning an importance value to each scene, shot and frame;
   allocating a number of keyframes among the scenes based on the importance value of each scene;
   allocating a number of keyframes among the shots based on the importance value of each shot;
   selecting the allocated number of keyframes from each shot; and
   altering the number of keyframes in response to user input.

29. A method for summarizing and navigating a video document comprising the steps of:
   decomposing the video document into a hierarchal tree of scenes, shots and frames;
   assigning an importance value to each scene, shot and frame;
   allocating a predetermined number of keyframes among the scenes;
   assigning the allocated keyframes in each scene among the shots of each scene;
   selecting the assigned number of keyframes from each shot; and
   altering the number of keyframes in response to user input.

30. The method of claim 29, wherein altering the number of keyframes in response to user input includes the step of removing one or more keyframes from the predetermined number of selected keyframes.

31. The method of claim 29, wherein altering the number of keyframes in response to user input includes the step of adding one or more keyframes to the predetermined number of selected keyframes.

* * * * *